United States Patent
Li et al.

(10) Patent No.: US 7,594,444 B1
(45) Date of Patent: Sep. 29, 2009

(54) TEST APPARATUS AND METHOD THEREWITH

(75) Inventors: Lei Li, Shenzhen (CN); Ping Chen, Shenzhen (CN); Chun-Ying Wang, Shenzhen (CN); Shu-Zhen Zhang, Shenzhen (CN); Xiao-Hong Huang, Shenzhen (CN); Chen-Jing Cao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/258,548

(22) Filed: Oct. 27, 2008

(30) Foreign Application Priority Data

Apr. 18, 2008 (CN) .................. 2008 1 0301202

(51) Int. Cl.
*G01L 5/00* (2006.01)
(52) U.S. Cl. .................. 73/862.01; 73/150 A
(58) Field of Classification Search .............. 73/862.01–862.382
See application file for complete search history.

(56) References Cited

U.S. PATENT DOCUMENTS

| | | | | |
|---|---|---|---|---|
| 5,687,061 A | * | 11/1997 | Mesfin et al. | 361/679.41 |
| 5,816,459 A | * | 10/1998 | Armistead | 224/246 |
| 6,282,950 B1 | * | 9/2001 | Taylor et al. | 73/150 A |
| 6,768,652 B2 | * | 7/2004 | DeLuga | 361/801 |
| 6,845,005 B2 | * | 1/2005 | Shimano et al. | 361/679.06 |
| 2005/0183498 A1 | * | 8/2005 | Li | 73/150 A |

* cited by examiner

*Primary Examiner*—Max Noori
(74) *Attorney, Agent, or Firm*—Steven M. Reiss

(57) ABSTRACT

A test apparatus for testing a separation force between a housing (92) and a subsidiary element (94) of a portable electronic device (100). The housing defines a plurality of through holes. The subsidiary element is attached to the housing, and covers the through holes. The test apparatus includes: a positioning apparatus (50), a push mechanism (60) and a test machine (70). The positioning apparatus positions the housing with the subsidiary element therein. The push mechanism includes a support board (62) and a plurality of rods (64). The rods are mounted in the support board. The rods pass through the through holes and resisting the subsidiary element. The test machine provides a driven force to press the support board to separate the subsidiary element from the housing.

10 Claims, 3 Drawing Sheets

TEST APPARATUS AND METHOD THEREWITH

BACKGROUND

1. Field of the Invention

The present invention generally relates to test apparatus and, particularly, to a test apparatus and method for testing a separation force between a housing and a subsidiary element in a portable electronic device.

2. Description of Related Art

At present, a portable electronic device usually have a decorative subsidiary element to provide an attractive appearance. The subsidiary element is generally attached to a housing of the portable electronic device by for example melting, ultrasonic welding, adhering or latching. To prevent the subsidiary element from separating from the housing due to accidental impacts, the maximum separation force between the subsidiary element and the housing generally needs to be tested to see whether the tested force is adequate.

A typical testing apparatus adopts a test block for adhering to the subsidiary element. The test block is connected to a test machine. The test machine pulls the test block, and further pulls the subsidiary element. When the subsidiary element separations from the housing, the test machine may record a maximum separating force. However, if the adhesive strength with the test block is not enough or the adhesive is uneven, the test block will firstly separates from the subsidiary element before the subsidiary element is separated from the housing. This will result in a test failure.

Therefore, there is room for improvement within the art.

BRIEF DESCRIPTION OF THE DRAWINGS

Many aspects of the test apparatus can be better understood with reference to the following drawings. The components in the drawings are not necessarily drawn to scale, the emphasis instead being placed upon clearly illustrating the principles of the test apparatus. Moreover, in the drawings, like reference numerals designate corresponding parts throughout the several views, in which.

DETAILED DESCRIPTION OF THE EMBODIMENTS

The present test apparatus is illustrated by testing a portable electronic device, in an exemplary embodiment, such as a mobile phone.

Figure 1:
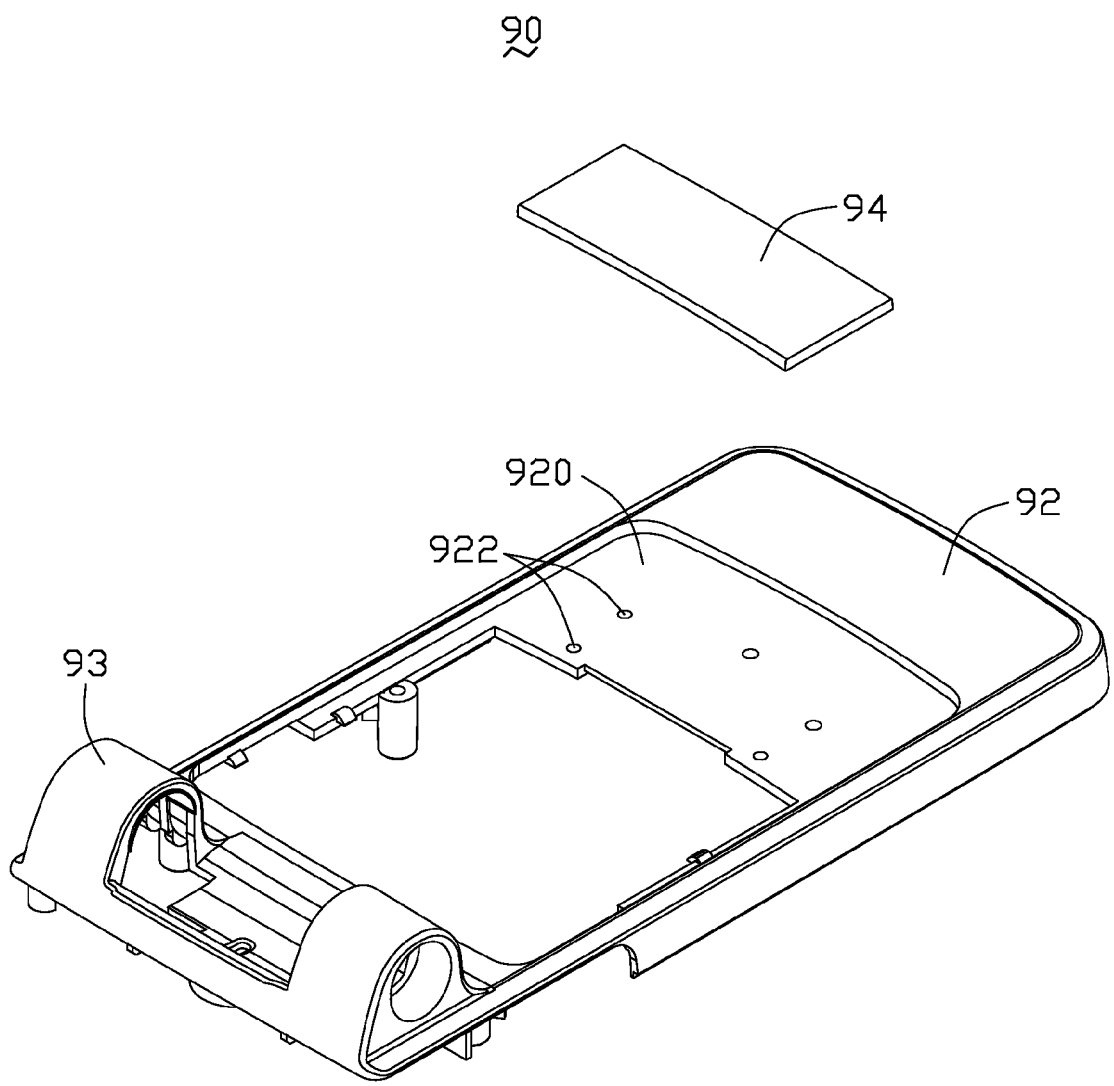
FIG. 1 is an exploded view of a housing and a subsidiary element for a portable electronic device.

FIG. 1 shows a portion of a mobile phone 90 including a housing 92 and a subsidiary element 94. The subsidiary element 94 contributes to the external decorative appearance of the housing 92. The housing 92 is made of plastic material, and includes a barrel portion 93. The housing 92 has a covered area 920 and a plurality of through holes 922 defined on the covered area 920. The subsidiary element 94 may be attached to the covered area 920 of the housing 92 by, for example, melting, ultrasonic welding, adhering or latching.

Figure 2:
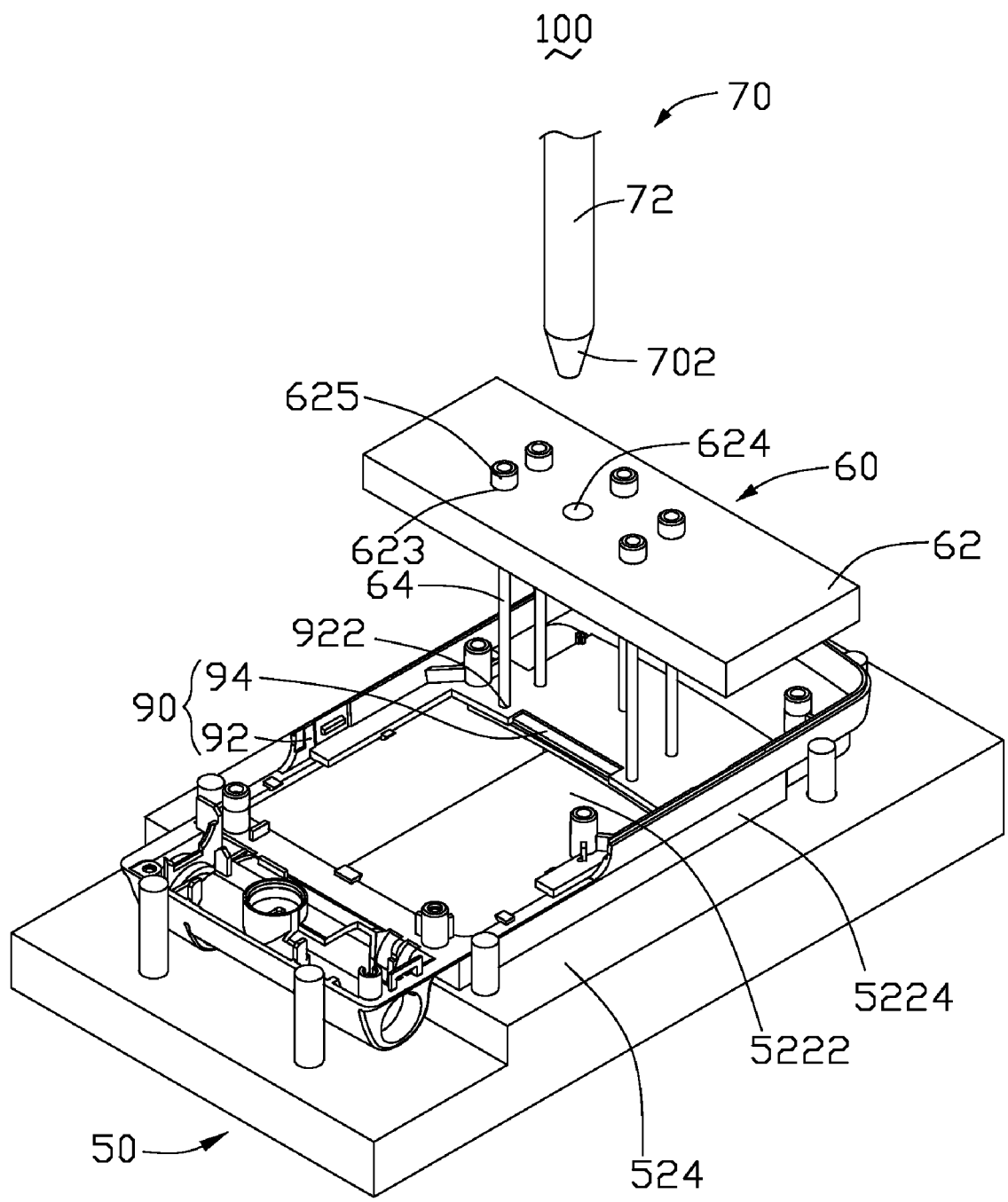
FIG. 2 is a schematic view of the test apparatus.

Referring to FIG. 2, the test apparatus 100 is used for testing the maximum separation force between the housing 92 and the subsidiary element 94. The test apparatus 100 includes a positioning apparatus 50, a push mechanism 60 and a test machine 70 (only a portion of which is shown).

Figure 3:
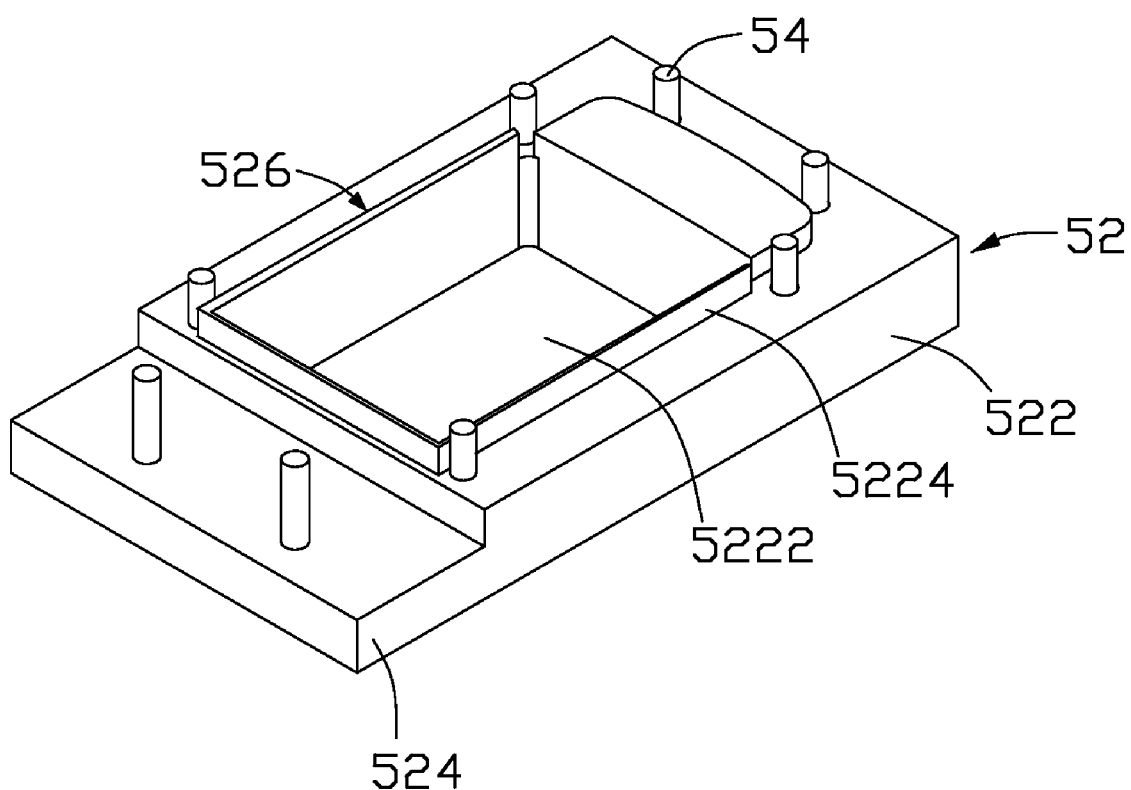
FIG. 3 is a schematic view of the positioning apparatus of FIG. 2.

Referring to FIG. 3, the positioning apparatus 50 includes a base 52 and a plurality of posts 54. The base 52 includes a main body 522 and an extending portion 524 integrally formed with the main body 522. The extending portion 524 is lower than the main body 522 and for supporting the barrel portion 93. The main body 522 defines an opening 5222 and includes a flange 5224 surrounding the opening 5222. Two of the posts 54 are positioning in the extending portion 524, the other of the posts 54 are positioning around the flange 5224, thereby forming a positioning area 526 for positioning the housing 92.

The push mechanism 60 includes a support board 62 and a plurality of rods 64. The support board 62 defines a receiving hole 624 at a central area and a plurality of positioning holes 623 surrounding the receiving hole 624. The arrangement of the positioning holes 623 corresponds to the through holes 922. A plurality of caps 625 are mounted in the positioning holes 623. One end of each rod 64 is tightly fixed to the positioning holes 623, and is latched in the cap 625. The other end of each rod 64 passes through a corresponding through hole 922 in the housing 92 for resisting the subsidiary element 94. Preferably, the receiving hole 624 is defined at a center of gravity of the support board 62.

The test machine 70 is configured for providing a press force to the support board 62, and records and shows a maximum separation force between a housing and a subsidiary element. The test machine 70 has a press head 72. The press head 72 has a taper end 702 at one end thereof. A maximum diameter of the taper end 702 is larger than the receiving hole 624. When the press head 72 is press downwardly towards the support board 62, the taper end 702 may contact and resist the support board 62 around the receiving hole 624 to further press down the support board 62. The support board 62 further pushes the rods 64 to press down the subsidiary element 94.

An exemplary method for testing an exemplary mobile phone 90 is illustrated. A housing 92 of a mobile phone 90 is provided. The housing 92 includes a covered area 920 defining a plurality of through holes 922. A subsidiary element 94 is attached to the covered area 920 by for example melting, ultrasonic welding, adhering or latching to cover the through holes 922.

Then, the mobile phone 90 with the subsidiary element 94 is located above the positioning area 526. The housing 92 is placed around the flange 5224, and the barrel portion 93 is positioning on the extending portion 524. The subsidiary element 94 is disposed toward the opening 5222.

After that, the rods 64 are mounted in the press board 62. The press board 62 is located above the positioning apparatus 50. The rods 64 pass through the through holes 922 of the housing 92, and resist the subsidiary element 94. The press head 72 of the test machine 70 is received in the receiving hole 624. The press head 72 is driven to press the press board 62 down towards the housing 92. The press board 62 further brings the rods 64 to press the subsidiary element 94 down until the subsidiary element 94 is separation from the housing 92. At that time, the test machine 70 records and shows the maximum force value.

As described above, the exemplary embodiment provides a test apparatus for testing portable electronic devices, such as mobile phones. This test apparatus may avoid a test failure.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A test apparatus for testing a separation force between a housing and a subsidiary element of a portable electronic device, the housing defining a plurality of through holes, the subsidiary element is attached to the housing, and covers the through holes, the test apparatus comprising:
 a positioning apparatus for positioning the housing with the subsidiary element therein;
 a push mechanism including a support board and a plurality of rods, the rods mounted in the support board, the rods passing through the through holes and resisting the subsidiary element;
 a test machine providing a driven force to press the support board to separate the subsidiary element from the housing.

2. The test apparatus as claimed in claim 1, wherein the positioning apparatus includes a base and a plurality of posts, the base defines an opening, and the posts are disposed in the base.

3. The test apparatus as claimed in claim 2, wherein the base includes a main body and an extending portion, and the extending portion is lower than the main body.

4. The test apparatus as claimed in claim 1, wherein the support board defines a plurality of positioning holes and a receiving hole, one end of the rods are fixedly mounted in the positioning holes.

5. The test apparatus as claimed in claim 4, wherein the test machine provides a press head, the press head includes a taper end, and the taper end is received in the receiving hole.

6. A test method for testing a separation force between a housing and a subsidiary element of a portable electronic device, the test method comprising:
 defining a plurality of through holes in the housing;
 attaching the subsidiary element to the housing, the subsidiary element covering the through holes;
 positioning the housing with the subsidiary element to a positioning apparatus;
 disposing a support board with a plurality of rods above the housing, and one end the rods received in the through holes;
 pressing the support board by a test machine to bring the rods to press the subsidiary element for separating the subsidiary element from the housing.

7. The test method as claimed in claim 6, wherein the positioning apparatus includes a base and a plurality of posts, the base defines an opening, and the posts are disposed in the base.

8. The test method as claimed in claim 7, wherein the base includes a main body and an extending portion, the extending portion is lower than the main body.

9. The test method as claimed in claim 6, wherein the support board defines a plurality of positioning holes and a receiving hole, and one end of the rods are fixed in the positioning holes.

10. The test apparatus as claimed in claim 9, wherein the test machine provides a press head, the press head includes a taper end, and the taper end is received in the receiving hole.

* * * * *